(12) United States Patent
Iijima

(10) Patent No.: US 7,639,326 B2
(45) Date of Patent: Dec. 29, 2009

(54) LIQUID CRYSTAL DEVICE AND ELECTRONIC APPARATUS

(75) Inventor: Chiyoaki Iijima, Ina (JP)

(73) Assignee: Epson Imaging Devices Corporation, Tokyo (JP)

(*) Notice: Subject to any disclaimer, the term of this patent is extended or adjusted under 35 U.S.C. 154(b) by 427 days.

(21) Appl. No.: 11/566,297

(22) Filed: Dec. 4, 2006

(65) Prior Publication Data

US 2007/0126954 A1 Jun. 7, 2007

(30) Foreign Application Priority Data

Dec. 5, 2005 (JP) .............................. 2005-350223

(51) Int. Cl.
G02F 1/1333 (2006.01)
G02F 1/1335 (2006.01)
(52) U.S. Cl. .................. 349/114; 349/106; 349/113; 349/122
(58) Field of Classification Search .................. None
See application file for complete search history.

(56) References Cited

U.S. PATENT DOCUMENTS

| 5,548,424 | A | * | 8/1996 | Takao et al. ................. 349/106 |
| 6,909,479 | B2 | | 6/2005 | Iijima |
| 2003/0030055 | A1 | | 2/2003 | Nakano et al. |
| 2005/0179839 | A1 | * | 8/2005 | Jung ............................ 349/113 |
| 2006/0279681 | A1 | * | 12/2006 | Kwon et al. ................. 349/122 |
| 2006/0285058 | A1 | * | 12/2006 | Kim ............................ 349/156 |

FOREIGN PATENT DOCUMENTS

| CN | 1515938 | A | 7/2004 |
| JP | 11-183892 | A | 7/1999 |
| JP | 2002-341333 | A | 11/2002 |
| JP | 2003-121831 | A | 4/2003 |
| JP | 2003195296 | | 7/2003 |
| JP | 2003228056 | | 8/2003 |
| JP | 2003-255323 | A | 9/2003 |
| JP | 2003270430 | | 9/2003 |
| JP | 2004-037500 | A | 2/2004 |
| JP | 2004-264513 | A | 9/2004 |
| JP | 2004258527 | | 9/2004 |
| JP | 2005018008 | | 1/2005 |
| JP | 2005-049638 | A | 2/2005 |
| JP | 2005099636 | | 4/2005 |
| JP | 2005241894 | | 9/2005 |
| JP | 2006-184379 | A | 7/2006 |

* cited by examiner

Primary Examiner—Tina M Wong
(74) Attorney, Agent, or Firm—Lowe Hauptman Ham & Berner, LLP

(57) ABSTRACT

A liquid crystal device is provided which has a pair of substrates provided with a plurality of sub-pixels and disposed opposite to each other and a liquid crystal layer sandwiched between the pair of substrates. The liquid crystal device further includes; a colorant layer formed in some of the sub-pixels in one substrate of the pair of the substrates; a control film that controls a step difference between the colored region in which the colorant layer exists and the non-colored region in which the colorant layer does not exist so that the surface on the liquid crystal layer of the one substrate is planarized in the sub-pixel, and that is provided in the non-colored region of the one substrate; and a reflective film formed on the control film and in the colored region. Here, the colorant layer is provided on the reflective film in the colored region.

17 Claims, 9 Drawing Sheets

LIQUID CRYSTAL DEVICE AND ELECTRONIC APPARATUS

BACKGROUND

1. Technical Field

The present invention relates to a liquid crystal device and an electronic apparatus.

2. Related Art

A liquid crystal device capable of providing a display to be viewed by using the external light in a bright place and an internal light source such as a backlight in a dark place has been proposed. That is, the liquid crystal device uses both reflection type of display and transmission type of display. Hereinafter, the liquid crystal device is referred to as a "transflective liquid crystal device" in the present specification.

FIG. 10A is a plan view of a sub-pixel of a liquid crystal device of the related art. FIG. 10B is a cross-sectional view of a liquid crystal device taken along line XB-XB line in FIG. 10A. As shown in FIG. 10A, within each sub-pixel which is a unit of image display, the transflective liquid crystal device comprises a reflective region R on which a reflective film is formed and a transmissive region T on which a reflective film is not formed.

Recently, such transflective liquid crystal devices have been required to output color light according to the development of portable apparatuses, etc. For this reason, as shown in FIG. 10B, a colorant layer 22 of a color filter of red R, green G and blue B is formed. In the case of this kind of transflective liquid crystal device, after the light incident on a panel in a reflective mode is transmitted through the colorant layer 22 of the color filter, it is reflected from a reflective film 21 and then transmitted through the colorant layer 22 again. Meanwhile, in a transmitting mode, illumination light incident from illuminating means such as a backlight is transmitted through the colorant layer 22.

As described above, in the transflective liquid crystal device, color display is obtained by allowing the incident light to be transmitted through the colorant layer 22 twice in a reflective mode and once in a transmissive mode. For this reason, when the colorant layer 22 of a light color is provided in order to appropriately realize the color in a reflective mode, it is difficult to obtain good chromogenic display in a transmissive mode. Meanwhile, when the colorant layer 22 of a dark color is provided in order to appropriately realize the desired color in a transmissive mode, the display in a reflective mode is excessively dark.

Therefore, a liquid crystal display device having the non-colored region NC in which the colorant region 22 does not exist in a portion of the reflective region R has been proposed (for example, see JP-A-2003-195296). In this case, a portion of light is transmitted through the non-colored region NC in a reflective mode. Therefore, the light transmitted through the colorant layer 22 in the reflective mode becomes the light consisting of the non-colored light transmitted through the non-colored region NC overlapping the colored light transmitting the colored region CL. Meanwhile, all the light transmitted from the transmissive region T in the transmissive mode is transmitted through the colored region CL so as to become colored light. The shade difference between colors can be decreased in the reflective mode and the transmissive mode. Therefore, if the colorant layer 22 is optimized, display of good color quality and good visibility can be obtained in both the reflective mode and the transmissive mode.

However, the liquid crystal device as described above has the following problems.

First, as shown in FIG. 10B, there is a problem that a step difference occurs between the colored region CL in which the colorant layer 22 exists and the non-colored region NC in which the colorant layer 22 does not exist. Since the colorant layer 22 is made of resin, it is necessary to make the thickness of the colorant layer 22 to be in the range of 0.5 to 2.0 μm to improve color purity. Therefore, even when an overcoat film (planarization film) 24 is formed over the colorant layer 22, a large step difference G of as much as 0.2 to 0.7 μm remains on the surface thereof. Therefore, the deviation of the cell thickness in the liquid crystal device causes deterioration of the electro-optical characteristics. If the thickness of the colorant layer 22 is large to improve the color purity, the difference in the cell thickness between the colored region CL and the non-colored region NC is also large, causing problems such as a domain generation in the liquid crystal device in an STN mode.

A light shielding part 20 neighboring a sub-pixel is formed of a black resin material in which silver, carbon, etc. are dispersed. The black resin is poor in terms of exposure sensitivity so that it cannot be formed having narrow width. Therefore, the light shielding part 20 becomes wider than deemed necessary to reduce the aperture ratio, causing a problem in that a displayed image becomes dark.

SUMMARY

In order to solve the above problems, an advantage of an aspect of the invention is that is provides a liquid crystal device capable of having a uniform cell thickness, and an improved aperture ratio. Moreover, another advantage of an aspect of the invention is that it provides an electronic apparatus having good display quality.

According to an aspect of the invention, there is provided a liquid crystal device having a pair of substrates provided with a plurality of sub-pixels and disposed opposite to each other and a liquid crystal layer sandwiched between the pair of substrates. The liquid crystal device includes: a control film that controls a step difference between the colored region in which the colorant layer exists and the non-colored region in which the colorant layer does not exist so that the surface on the liquid crystal layer of the one substrate is planarized in the sub-pixel, and that is provided in the non-colored region of the one substrate; and a reflective film formed on the control film and in the colored region, wherein the colorant layer is provided on the reflective film in the colored region.

According to the structure, the colorant layer is disposed in the colored region and the control film is disposed in the non-colored region so that it is possible to reduce the step difference between the two regions. Therefore, it is possible to make the cell thickness of the liquid crystal device uniform.

It is preferable that the reflective region in which the reflective film exists and the transmissive region in which the reflective film does not exist are formed in the sub-pixels, and the colorant layer is formed in the transmissive region and in a portion on the reflective film in the reflective region.

According to the structure, the reflective display is implemented by the light transmitting the colorant layer twice in the colored region and the light not transmitting the colorant layer in the non-colored region, and the transmitting display is implemented by the light transmitting the colorant layer once in the colored region. Therefore, it is possible to make the shade difference between the reflective display and the transmitting display small, providing the liquid crystal device having good display quality.

It is preferable that the control film includes resin material. According to the structure, the film thickness of the control film can freely and easily be set.

It is preferable that the control film includes material with light shielding property, and is formed in the sub-pixels and in a region between the neighboring sub-pixels among the plurality of sub-pixels.

According to the structure, it is possible to form the control film as well as to form the light shielding part in the region between the sub-pixels so that no separate addition of the process for forming the control film is necessary, preventing the increase of manufacturing cost.

It is preferable that a region in which the reflective film is not formed is provided on the control film in the region between the sub-pixels.

According to the structure, it is possible to form the light shielding part with good precision only in the region between the sub-pixels, enhancing the aperture ratio.

It is preferable that the liquid crystal device has a display region in which the plurality of the sub-pixels are disposed, and the control film includes material with light shielding property and is formed in the display region and in a non-display region around the display region.

According to the structure, it is possible to reduce the step difference between the display region and the non-display region. Therefore, it is possible to make the cell thickness in the peripheral portion of the display region uniform.

It is preferable that the region that the reflective region does not exist is arranged in the non-display region. According to the structure, since the light does not reflect in the non-display region, stains or alternative lighting by means of wirings disposed in the non-display region are invisible even in the case of reflective display.

It is preferable that the thickness of the control film is formed to be equal to that of the colorant layer. According to the structure, it is possible to make the cell thickness of the liquid crystal device highly uniform.

The non-colored region may be disposed in the peripheral portion in the sub-pixels.

According to the structure, the control film can successively be formed covering the non-colored region in the region between the sub-pixels so that it is possible to secure the area of the non-colored region. Therefore, a bright image display can be implemented.

The non-colored region may be arranged in the central portion in the sub-pixels.

According to the structure, it is possible to prevent the non-colored region from being affected by the deterioration of anchoring force in the region between the sub-pixels. Therefore, the bright image display by means of the non-colored region can be implemented.

It is preferable that a side surface of the control film is inclined, and the reflective film is disposed on the inclined surface.

According to the structure, it is possible to give effects similar to diffusion to the reflective light so that the image display of wide viewing angle can be implemented.

According to another aspect of the invention, there is provided an electronic apparatus comprising the liquid crystal device as described above.

According to the structure, it comprises the liquid crystal device with high aperture ratio due to the uniform cell thickness, capable of providing an electronic apparatus having good display quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the embodiments of the invention will be described with reference to the attached drawings. In addition, in order to enable identification of each member in the figures used for the following description, the scale of the members is appropriately changed.

First Embodiment

Figure 1:
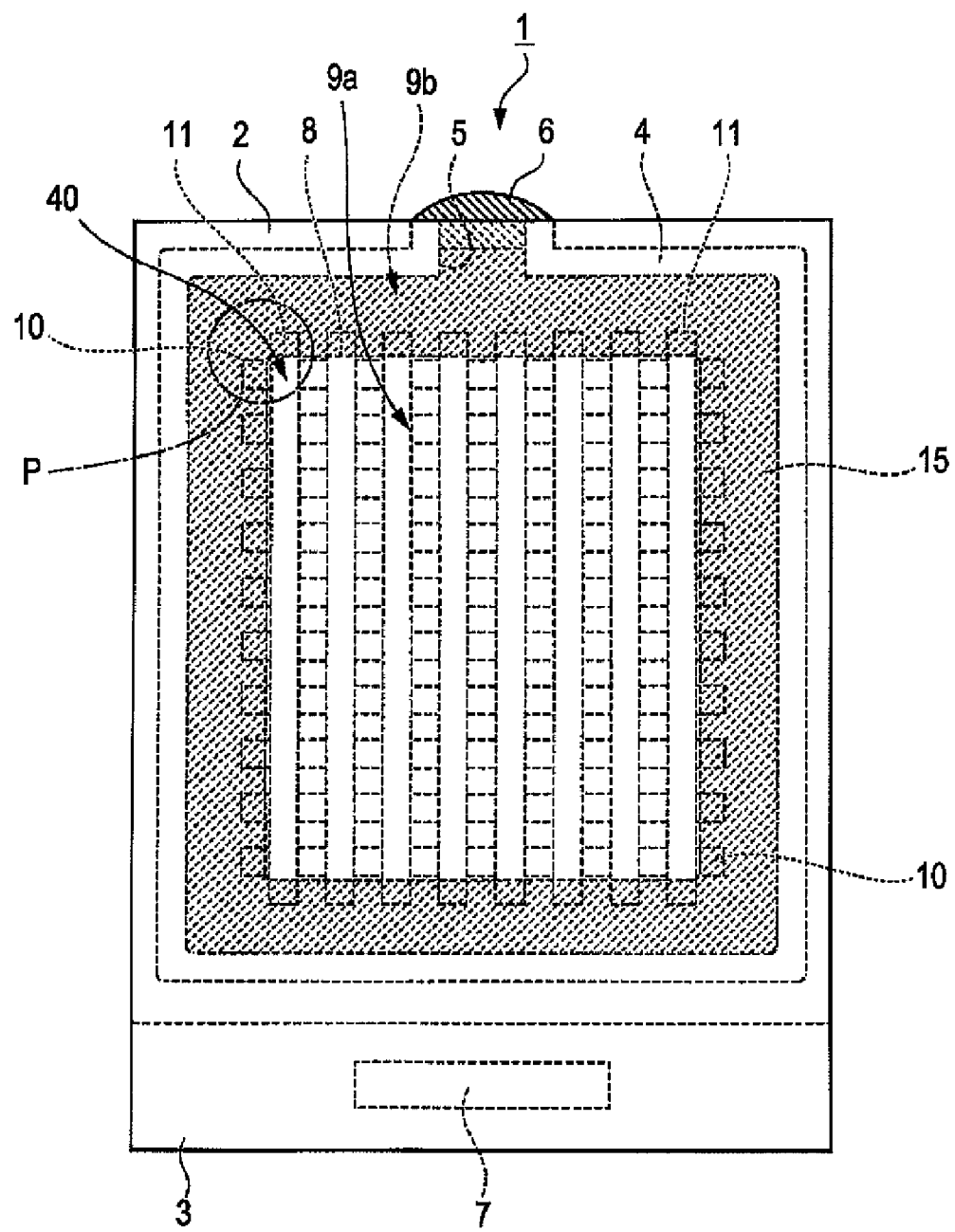
FIG. 1 is a plan view showing the whole constitution of a liquid crystal device.

FIG. 1 is a plan view showing the whole constitution of a liquid crystal device. The liquid crystal device according to the embodiment is a transflective color liquid crystal device of a passive matrix type. The transflective color liquid crystal device is a liquid crystal device normally operating in a black mode, which represents black display in the state in which voltage is not applied to a liquid crystal layer, i.e., a non-applied state.

Liquid Crystal Device

As shown in FIG. 1, A liquid crystal device 1 according to the embodiment includes a lower substrate (a second substrate) 2 and an upper substrate (a first substrate) 3 having rectangular shape, when viewed from above. The lower substrate 2 and the upper substrate 3 are disposed opposite to each other with a seal member 4 arranged therebetween. A portion of the seal material 4 is open on some sides (top sides as shown in FIG. 1) of each of the substrates 2 and 3 so that a liquid crystal injecting hole 5 is formed. A space enclosed between the substrates 2 and 3 and the seal material 4 is filled with liquid crystal such as super twisted nematic (STN) liquid crystal, etc. The liquid crystal injecting hole 5 is filled with a filling material 6. In the embodiment, one of dimensions of the upper substrate 3 is larger than that of the lower substrate 2, the edges of the sides (a top side, a right side, a left side as shown in FIG. 1) of the lower substrate 2 are aligned with the edges of the sides (a top side, a right side, a left side as shown in FIG. 1) of the upper substrate 3; however, a peripheral portion of the upper substrate 3 is disposed so as to be projected from the remaining one side (a bottom side as shown in FIG. 1) of the lower substrate 2. In addition, the end portion of the bottom side of the upper substrate 3 is mounted with a semiconductor element 7 for driving electrodes disposed on both the lower substrate 2 and the upper substrate 3.

A dotted line 8 represents a border line of a display region 9a and non-display region 9b. Herein, a region (a central region) inside the border line 8 is the display region 9a for displaying images. The display region 9a is the region within which a plurality of pixels are arranged in a matrix. The display region 9a actually displays images. Meanwhile, a region (a peripheral region) outside the border line 8 is a non-display region 9b, which is positioned outside the display region 9a. The non-display region 9b does not display images. Further, the non-display region 9b is provided with a peripheral light shielding part 15, which provides shielding against peripheral light.

In the case of the embodiment, as shown in FIG. 1, a plurality of segment electrodes 11 are formed on the upper substrate 3 in a stripe shape, wherein the segment electrodes 11 extend in a band shape in a vertical direction. Meanwhile, a plurality of common electrodes 10 are formed on the lower substrate 2 in a stripe shape, wherein the common electrodes 10 are disposed so as to be orthogonal to the segment electrodes 11 and extend in a band shape in a horizontal direction. Herein, since the segment electrodes 11 intersect the common electrodes 10, rectangular regions are formed between the overlapping electrodes when viewed from above. The rectangular regions form "sub-pixels" 40, which is a unit of image display. In the present specification, a region interposed between two neighboring sub-pixels 40 is referred to as "the region between the sub-pixels". Although described below in more detail, each of the plurality of the sub-pixels 40 in the display region 9a is provided with a colorant layer in order to display colors, wherein the colorant layer is formed of a R(red), G(green), or B(blue) color filter. The colorant layer performs coloring of light emitted from each pixel. One pixel on a display is formed of three sub-pixels 40 of R, G, and B.

Light Shielding Part and Control Film

Figure 2:
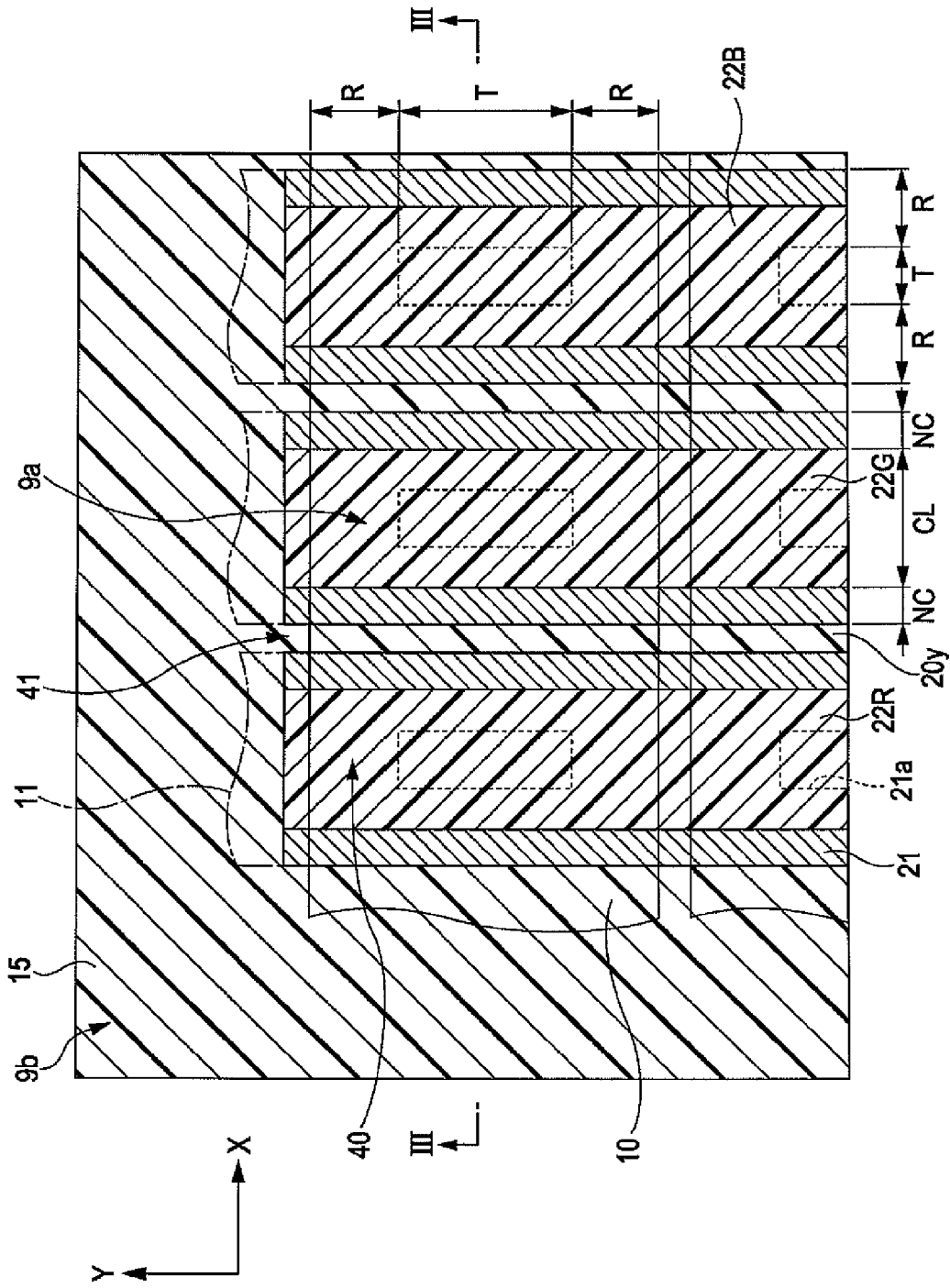
FIG. 2 is a plan view of a liquid crystal device according to a first embodiment.

FIG. 2 is a plan view of the lower substrate in the P portion of FIG. 1. In FIG. 2, the positions of the segment electrodes 11 formed on the upper substrate are represented by a one-dot chain line. In addition, in FIG. 2, a short direction (a horizontal direction) of the sub-pixel 40 is referred to as an X direction and a long direction (a vertical direction) thereof is referred to as a Y direction. As shown in FIG. 2, the sub-pixels 40 are formed in the regions between the intersecting segment electrodes 11 and the common electrodes 10.

In the embodiment, the region 41 between neighboring sub-pixels 40 (the region between sub-pixels extending in Y direction) of different colors in the X direction of FIG. 2 is provided with a light shielding part 20y in a band shape. Meanwhile, the region (the region between sub-pixels extending in X direction) neighboring sub-pixels 40 of the same color in Y direction is not provided with the light shielding part. Accordingly, in the liquid crystal device, the display region 9a is provided with the plurality of the light shielding parts 20y formed in a band shape corresponding to the region 41 between the sub-pixels formed in a stripe shape, wherein the light shielding parts extend in Y direction. As described above, the peripheral non-display region 9b is provided with the peripheral light shielding part 15. The surface of the peripheral light shielding part 15 is not provided with a reflective film. The peripheral light shielding part 15 and the light shielding parts 20y in a band shape are integrally formed. In this way, when the non-display region 9b is provided with the peripheral light shielding part 15, it is possible to reduce a step difference between the display region 9a and the non-display region 9b. Therefore, it is possible to make a cell thickness in the peripheral portion of the display region 9a uniform.

The light shielding parts 20y and the peripheral light shielding part 15 are provided with a photosensitive resin material in which black carbon or the like with high light absorption property is dispersed. Further, each of the light shielding parts may be provided with a lower film of black metal such as Cr and an upper film of a resin material. Since each of the light shielding parts is formed of resin material, it is possible to freely and easily set a film thickness thereof. A control film described below may be formed of a photosensitive resin material. In addition, the color of the control film may be black, blue, or another color.

Figure 3:
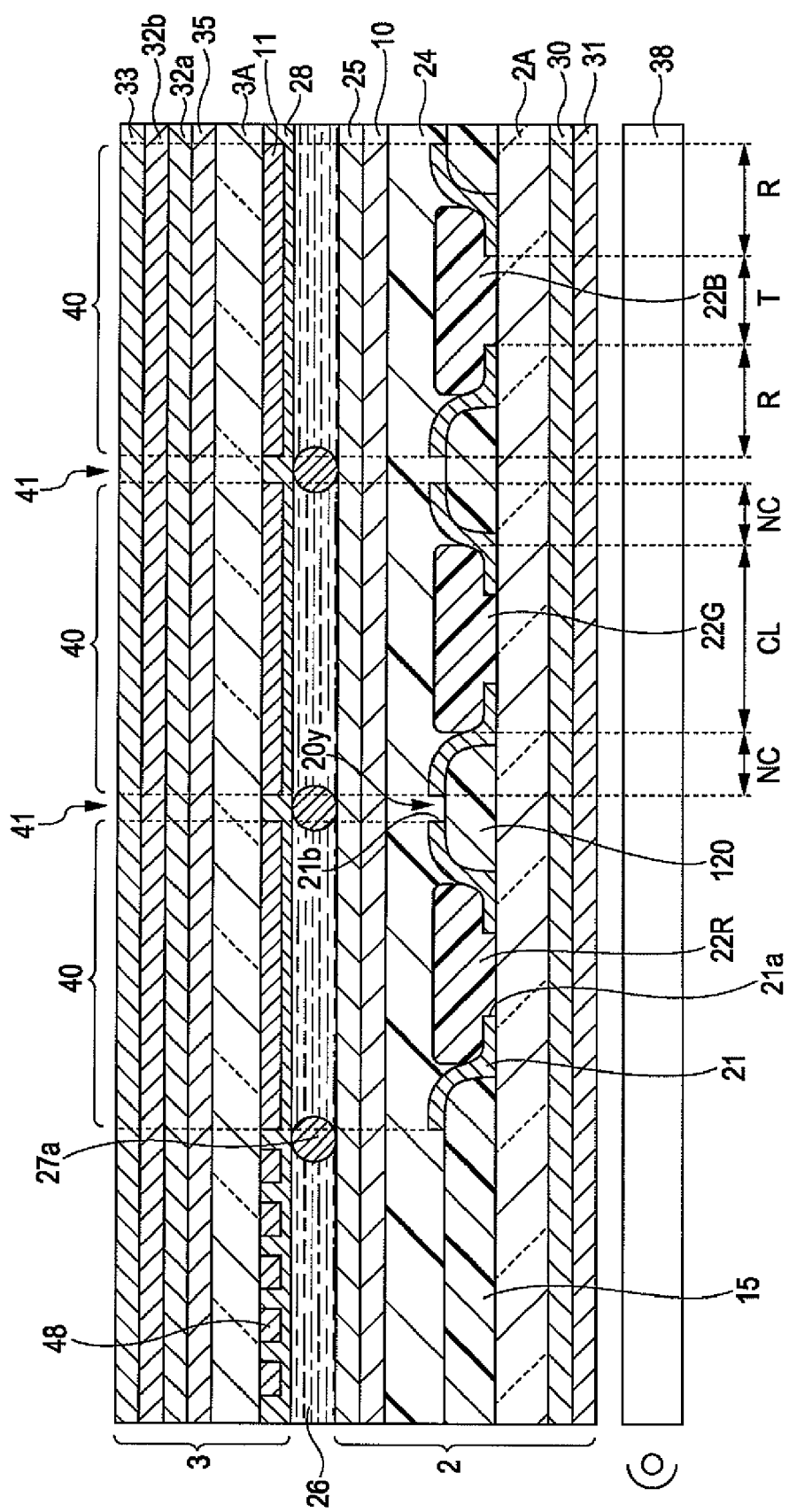
FIG. 3 is a cross-sectional view taken along III-III line of FIG. 2.

FIG. 3 shows a cross-sectional view taken along line III-III of FIG. 2. As shown in FIG. 3, the lower substrate 2 comprises a substrate body 2A, which is formed of a transmissive material such as glass or plastic. The surface of the substrate body 2A is provided with a control film 120 that controls the step difference of the colorant layer 22. The thickness of the control film 120 is set to be in the range of about 0.5 to 2.0 μm to be equal to that of the colorant layer. Further, the cross section of the control film 120 is a trapezoid and the side surface thereof is inclined. The control film 120 is formed in the region 41 between the sub-pixels and in the non-colored region NC of the neighboring sub-pixels 40 to be overlapped. As a result, the width of the control film 120 is larger than that of the region 41 between the sub-pixels.

Reflective Film

A reflective film 21 is formed from the central portion of each of the sub-pixels 40 to the upper surface of the control film 120. An adhesion improving film (not shown) of $SiO_2$, or the like is formed between the control film 120 and the reflective film 21. The reflective film 21 is formed of a metal with a high light reflectivity such as aluminum or an alloy thereof, silver or an alloy thereof. The upper surface of the control film 120 in the region 41 between the sub-pixels is aligned with the region in which the reflective film 21 is not formed. More specifically, island shaped portions of the reflective film may be provided in a matrix and the upper surface of the control film 120 may be provided with the reflective film 21 including slits 21b. The control films 120 of black resin are exposed through the slits 21b and are provided with the light shielding parts 20y. As such, if the control film 120 includes material with a light shielding property, it can be formed in a process forming the light shielding parts 20y. Thereby, a separate process for forming the control film 120 is not needed, preventing an increase in manufacturing cost.

Further, the black resin is poor in terms of exposure sensitivity so that it cannot be patterned with a narrow width. However, the reflective film 21 of metal material can be patterned with good precision by using photolithography, etc. Therefore, the upper surface of the control film 120 in the region 41 between the sub-pixels is provided with the reflective film 21 having the slits 21b so that only the region 41 between the sub-pixels can be provided with the light shielding part 20y with good precision. As a result, the aperture ratio of a liquid crystal device can be improved, realizing bright image display.

Further, opening parts 21a of the reflective film 21 are formed at the central position of each of the sub-pixels 40. Each of the opening parts 21a (the region in which the reflective film does not exist) is formed with a transmissive region T. Meanwhile, the region (the region in which the reflective film exists) other than the opening parts 21a is aligned with a reflective region R. Herein, the side surface of the control film 120 is inclined. Since the inclined surface is disposed with the reflective film 21, light incident from a direction normal to the plane of the liquid crystal device is reflected in directions other than the normal direction. Therefore, it is possible to provide an effect in which the reflected light is diffused so that the image display of a wide viewing angle can be implemented. The surface of the reflective film 21 may be formed with a relief for diffusing the reflected light, making brightness uniform.

Colorant Layer

As shown in FIG. 2, each of the sub-pixels 40 is provided with a colorant layer 22 of a color filter (a red colorant layer 22R, a green colorant layer 22G, a blue colorant layer 22B). Each of the colorant layers 22 is formed of a photosensitive resin material. In addition, each of the colorant layers 22 is formed with a thickness in the range of about 0.5 to 2.0 µm in order to improve color purity. An array pattern of the colorant layer 22 is referred to as a longitudinal stripe. That is, the sub-pixels 40 to be adjacent a vertical direction are provided with the colorant layer 22 of the same colors and the sub-pixels 40 to be adjacent in a horizontal direction are alternatively provided with the colorant layers 22B, 22G, 22B of different colors in sequence.

As shown in FIG. 3, the entirety of the transmissive region T is provided with the colorant layer 22, while the reflective region R is provided with a colored region CL in which the colorant layer 22 is disposed and a non-colored region NC in which the colorant layer 22 is not disposed. According to the structure, the reflective display is implemented by the light being transmitted through the colorant layers 22 twice in the colored region CL and the light not being transmitted through the colorant layers 22 in the non-colored region NC. The transmittive display is implemented by the light being transmitted through the colorant layer 22 once in the colored region CL. Accordingly, it is possible to make the shade difference between the reflective display and the transmittive display small. Therefore, if each of the colorant layers 22 is optimized, a display of good color quality and good visibility can be obtained in both the reflective mode and the transmissive mode.

Further, both end portions of a short direction (a horizontal direction in FIG. 3) of the sub-pixels 40 are provided with the control film 120 as described above. The colorant layer 22 is formed from the central portion of each of the sub-pixels 40 to the surface of the reflective film 21, which is disposed on the side surface of the control film 120. Since the side surface of the control film 120 is inclined, there is an overlapping region (on the inclined surface) in which the control film overlaps the colorant layer. The surface of the reflective film 21 disposed on the upper surface of the control film 120 is not provided with the colorant layer 22. For this reason, the reflective film 21 disposed on the upper surface of the control film 120 forms the non-colored region NC. The control film and the colorant layer may be formed so that the non-colored region is formed in a band shape traversing the sub-pixels.

As such, the colored region CL in which the colorant layer 22 exists is disposed near the central portion of each of the sub-pixels 40. The non-colored region NC in which the colorant layer 22 does not exist is disposed at both end portions in a short direction of each of the sub-pixels 40. The area of the non-colored region NC may be varied in accordance with each of the sub-pixels of different colors. In this case, it is preferable that the area of the non-colored region NC in the sub-pixels corresponding to green is wider than that of the non-colored region NC in the sub-pixels corresponding to blue.

As shown in FIG. 3, the inner surface of the lower substrate 2 is formed with an overcoat film (a planarization film) 24 of a resin such as acrylic or an inorganic material such as silicon oxide, wherein the overcoat film planarizes a step difference resulting from functional films such as the colorant layer 22 and protects the surfaces of the colorant layer 22. A common electrode 10 formed of a transparent conductive film such indium tin oxide (hereinafter, referred to as ITO) and an alignment film 25 formed of polyimide, etc., are sequentially formed on the overcoat film 24. There may be an underlayer disposed between the colorant layer and the control film and the substrate body.

Meanwhile, the upper substrate 3 comprises a substrate body 3A formed of a transmissive material such as glass or plastic. The segment electrode 11 formed of a transparent conductive material such as ITO and an alignment film 28 of polyimide, etc. are formed on the inner surface of the substrate body 3A in this order. The inner surface of the upper substrate 3 is provided with a drawing electrode 48 corresponding to the upper portion of the peripheral light shielding part 15. The drawing electrode 48 is to enable conduction between the electrode on the lower substrate 2 and the upper substrate 3 and then draw wirings to terminals on the upper substrate 3. Since voltage is applied between the drawing electrode 48 and the common electrode 10, in the case that the reflective film is formed on the black peripheral light shielding part 15, an alignment state of liquid crystal is changed so that the light can be emitted. However, if the reflective film is not formed in the non-display region, since the light is absorbed by the black peripheral light shielding part 15 even in the case in which the alignment state of liquid crystal is changed, the light cannot be emitted. The liquid crystal layer 26 is sandwiched between the upper substrate 3 and the lower substrate 2. The inside of the liquid crystal layer 26 is interposed with a spacer 27a of a spherical shape to secure a desired cell thickness.

As shown in FIG. 3, the outer surface side of the lower substrate 2 is provided with a phase difference plate (λ4 plate) 30 and a polarizing plate 31 in this order. The outer surface side of the polarizing plate 31 is provided with a backlight (illumination apparatus) 38. The backlight 38 comprises a light source such as cold cathode tube, a light emitting diode (LED), a reflective plate, or a lightguide plate. The outer surface side of the upper substrate 3 is provided with a forward diffusing plate 35, a first phase difference plate 32a, a second phase difference plate 32b, and a polarizing plate 33 in this order. The forward diffusing plate 35 diffuses image light so as to emit it. The outer surface side of the upper substrate 3 may be provided with a forward diffusing layer, instead of the forward diffusing plate.

Method of Manufacturing Liquid Crystal Device

Next, a method of manufacturing a liquid crystal device according to the embodiment will be described. First, as shown in FIG. 3, the surface of the substrate body 2A is provided with the control film 120. More specifically, the whole surface of the substrate body 2A is applied with liquid black resin and the pattern of the control film 120 is exposed and developed through an exposed photomask to form the control film 120.

Next, the reflective film 21 is formed. More specifically, the metal film is formed to cover the whole of the substrate 2A and the control film 120. The formation of the metal film can be achieved by a sputtering method, a vapor deposition method, a CVD method, etc. Subsequently, the metal film is patterned by photolithography. More specifically, the region forming the reflective film 21 in the metal film is formed with a resist mask, etc. Then, the metal film is etched through the mask. Finally, the mask is removed to form the reflective film 21.

However, since the exposure sensitivity of the black resin forming the control film 120 is low, it is difficult to pattern the control film in so as to have a narrow width. However, in the embodiment, the control film 120 is formed with a large width so that the surface of the reflective film 21 has opening of a small width. The patterning of the reflective film 21 can be implemented with good precision by photolithography. Therefore, the light shielding part 20y of the region 41 between the sub-pixels is formed in a predetermined shape so that aperture ratio can be improved and a bright image display realized.

Next, the colorant layer 22 is formed. More specifically, liquid material of any one (a first colorant layer) of the plurality of the colorant layers 22R, 22G, 22B is applied to the whole surface of the lower substrate 2. Then, the pattern of the first colorant layer is exposed and developed by the exposed photomask so that the first colorant layer is formed. Likewise, other colorant layers are sequentially formed. Next, the overcoat film 24 is formed so as to cover the whole of the lower substrate 2. The overcoat film 24 of a resin material can be formed by a spin coating method, a spray coating method, a dipping method, or the like. The overcoat film of an inorganic material such silicon oxide can be formed by a CVD method or a sol-gel method, or the like.

Figure 4A:
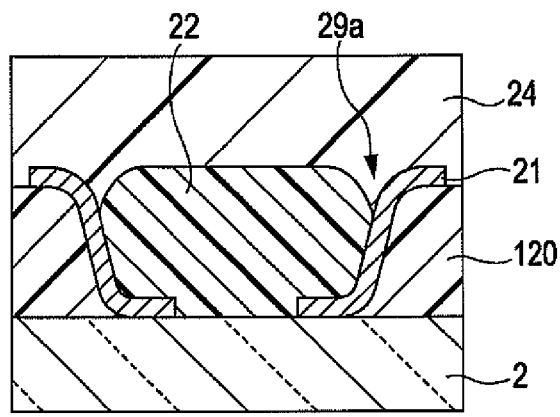
FIGS. 4A to 4D are modification examples of an end shape of a colorant layer.
Figure 4B:
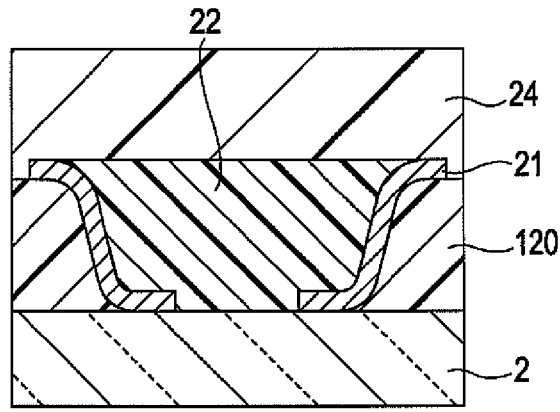
Figure 4C:
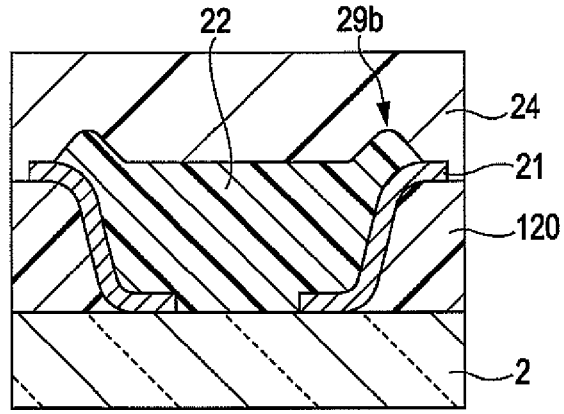

FIGS. 4A to 4D are modified examples of the end shape of the colorant layer. In FIG. 4A, the end portion of the colorant layer 22 covers only a portion of the reflective film 21 disposed on the side surface of the control film 120. Therefore, a concave part 29a is formed between the colorant layer 22 and the reflective film 21. Further, in FIG. 4B, the end portion of the colorant layer 22 covers the whole of the reflective film 21 disposed on the side surface of the control film 120. Therefore, the whole surface of the colorant layer 22 is formed to be approximately flat. In FIG. 4C, the end portion of the colorant 22 covers the whole of the reflective film 21 disposed on the side surface of the control film 120 and is projected from the surface of the reflective film 21 disposed on the upper surface of the control film 120 so that a convex part 29b is formed.

In any event, the overcoat film 24 is formed so as to cover the lower substrate 2. As shown in FIG. 4A, in the case in which the concave part 29a is shallow or the convex part 29b is of small height, the surface of the overcoat film 24 is formed to be approximately flat. Therefore, when forming the colorant layer 22 that shown in FIG. 4B being a standard shape, the surface of the overcoat film 24 can be formed to be approximately flat even in case in which the colorant layer 22 is formed as in FIG. 4A or FIG. 4C due to alignment deviation of the photomasks.

Figure 4D:
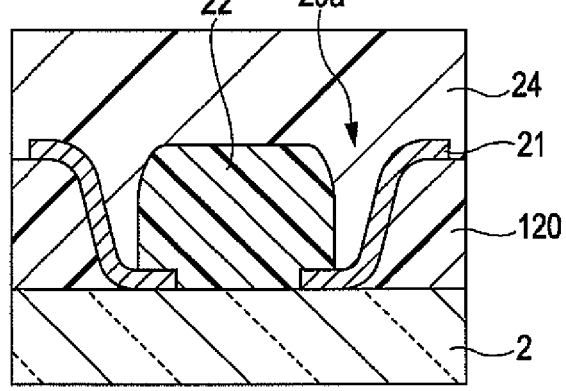
Figure 10A:
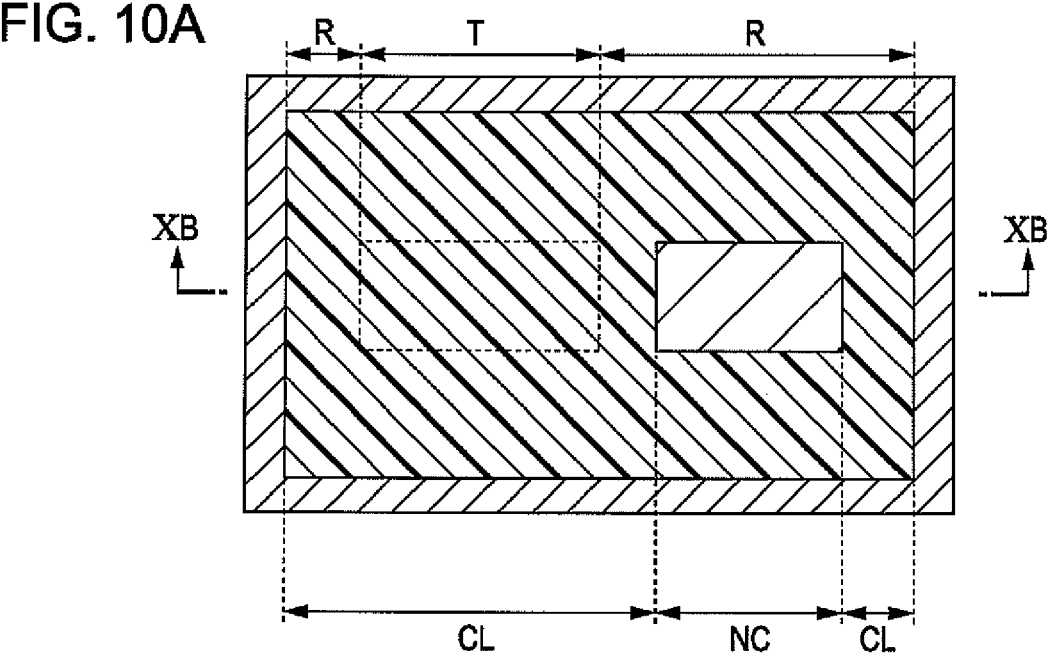
FIGS. 10A and 10B are an explanatory view according to the related art.
Figure 10B:
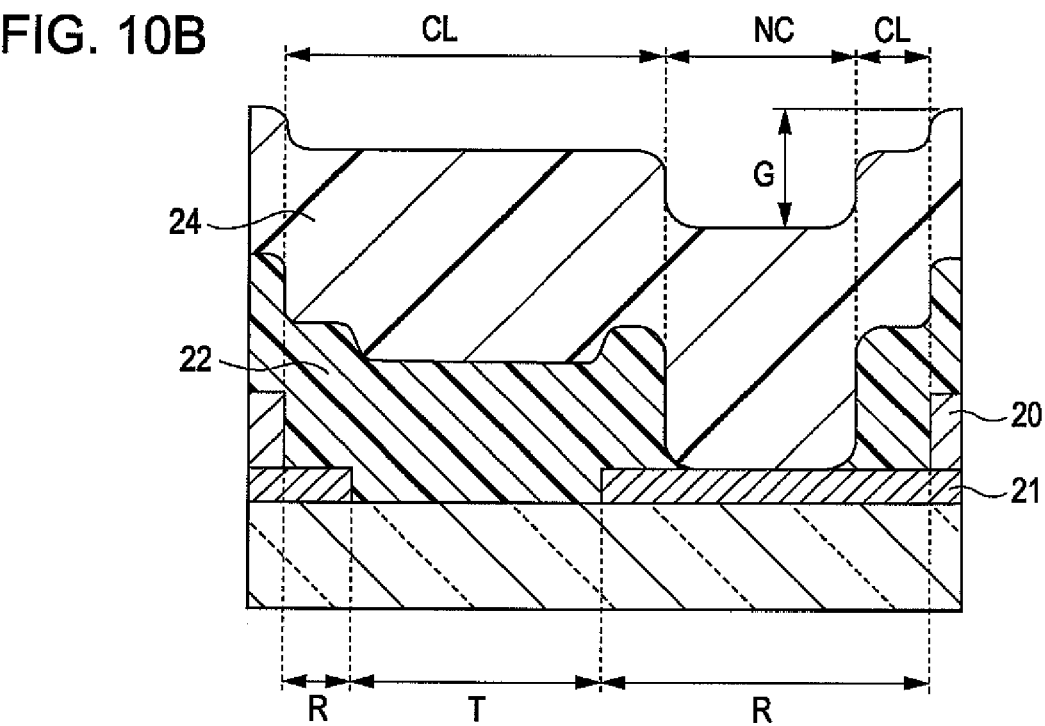

As shown in FIG. 4D, even although the concave part 29 is deep, since the thickness of the overcoat film 24 is in the range of 2 to 4 μm, the width of the concave part 29a is formed to be sufficiently small (5 μm or less) so that the surface of the overcoat film 24 can be formed to be approximately flat. However, in the case in which the width of the concave part 29a is wide, since the whole of the non-colored region is not removed as shown in FIGS. 11A and 10B, the effect of planarization becomes larger than that of the related art.

As described above, the liquid crystal device according to the embodiment is provided with the colored region in which the colorant layer of the color filter exists and the non-colored layer in which the colorant layer does not exist. The non-colored layer is provided with the control film that controls the step difference between the colorant layer and the reflected film is provided on the surface of the control film.

According to this structure, the colored region is provided with the colorant layer and the non-colored region is provided with the control film so that the step difference between the regions can be reduced. Therefore, it is possible to make the cell thickness of the liquid crystal device uniform. As a result, it is possible to prevent troubles such as a domain generation in the liquid crystal device in STN mode. Further, the trouble of the domain generation means that the liquid crystal device in the STN mode is not twisted in a direction perpendicular to the substrate by a predetermined angle (for example, 240°) or twisted in a direction horizontal to the substrate.

Even when the thickness of the colorant layer is thick in order to improve color purity, the thickness of the control film is equal to that of the colorant layer so that it is possible to make the cell thickness of the liquid crystal device highly uniform. Since the control film is constituted by resin material, it is possible to easily control its thickness. The inventor first produces the liquid crystal device according to the embodiment using the film thickness of the colorant layer and the control film as 0.8 μm, 1.0 μm, and 1.2 μm. In any film thickness, the surface of the overcoat film is planarized so that it is possible to make the cell thickness uniform. Therefore, a voltage difference, which is maximum contrast in the case of reflection and transmission, is reduced. Further, the contrast and NTSC ratio (it indicates, as area ratio, color reproduction for XY chromaticity range defined in National Television System Committee Specification) are improved.

The liquid crystal device according to the embodiment, since the control film is formed of material with light shielding property, it is possible to form the control film in a forming process of the light shielding part so that a separate process for forming the control film is not required, thereby preventing an increase of manufacturing cost. Further, the peripheral light shielding part is formed in the non-display region using the control film that controls the step difference of the colorant layers so that the step difference of the display region and the non-display region can be reduced. Accordingly, distortion of electro-optical characteristics can be restricted in the peripheral portions of the display region.

In the liquid crystal device according to the first embodiment, the non-colored region is disposed on the peripheral portions of the sub-pixels. According to the structure, the control film is continuously formed from the region between sub-pixels to the non-colored region so that the area of the non-colored region can be secured, thereby implementing a bright image display.

Figure 5:
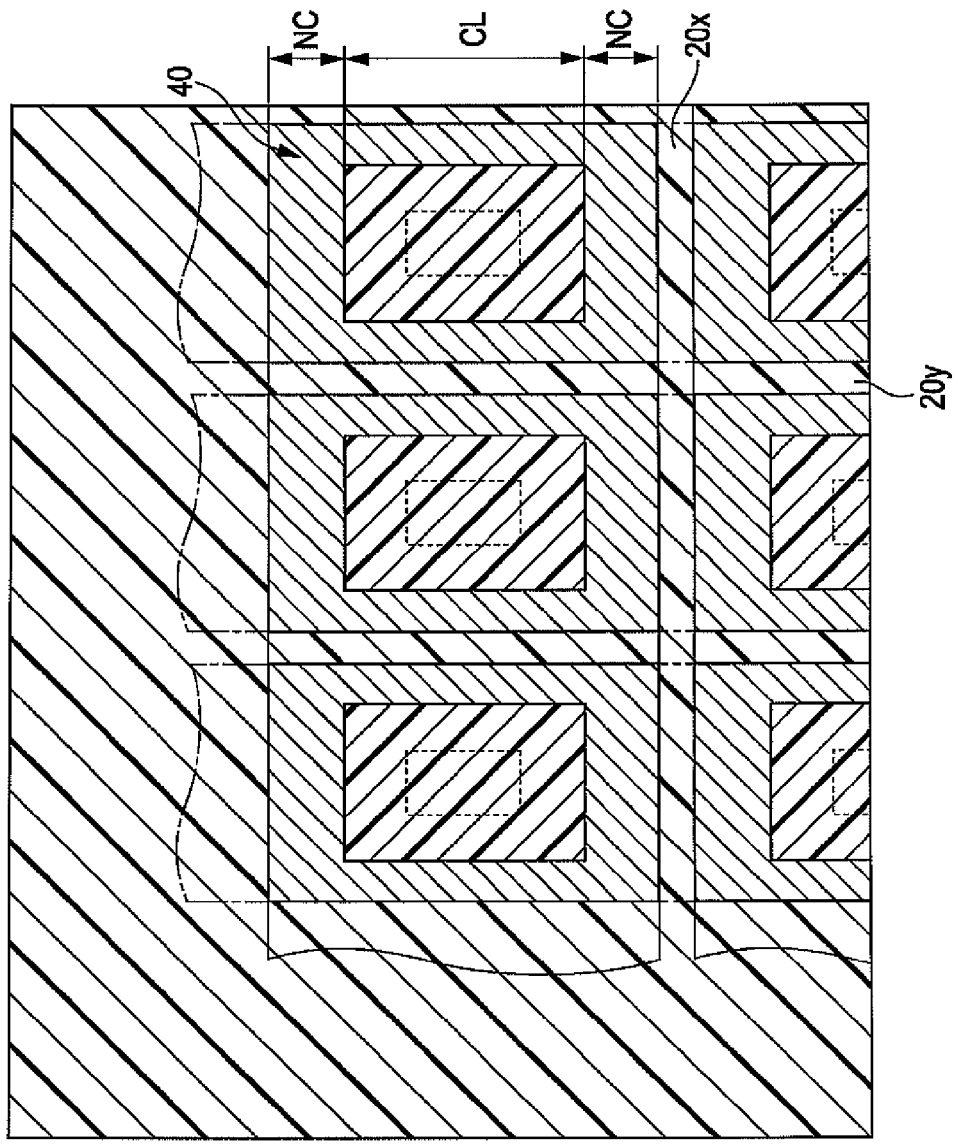
FIG. 5 is a plan view of a liquid crystal device according to the modification example of the first embodiment.

FIG. 5 is a plan view of a liquid crystal device according to a modification example of the first embodiment and shows a plan view of the lower substrate in a portion corresponding to the P portion of FIG. 1. In the first embodiment shown in FIG. 2, the light shielding part 20y in a band shape is provided in the region between sub-pixels (the region between sub-pixels extending in Y direction) in the neighboring sub-pixels 40 of different colors in the X direction. The non-colored region NC is also provided in the peripheral portions of the X direction in the inside of the sub-pixels.

In an modified example shown in FIG. 5, the light shielding part 20x in a band shape is provided in the region between the neighboring sub-pixels 40 (the region between sub-pixels extending in X direction) of the same colors in Y direction. That is, the light shielding parts 20x, 20y are disposed in a lattice form. The non-colored region NC is also provided in the peripheral portions in the Y direction in the inside of the sub-pixels. That is, the non-colored region NC is provided in the entire peripherals of the sub-pixels. According to the structure, it is possible to expand the area of the non-colored region, implementing a brighter image display. All the regions between sub-pixels are light-shielded so that light leakage from the regions between sub-pixels whose alignment is not controlled can be restricted, thereby improving contrast of display image. The colorant layer is disposed in regions surrounded in a matrix form in the control film disposed in a lattice form so that the liquid material of the colorant layers for the sub-pixels corresponding to neighboring different colors cannot leak. Thereby, the liquid material of the colorant layer can be securely applied in the corresponding sub-pixels.

Second Embodiment

A liquid crystal device according to the second embodiment will now be described.

Figure 6:
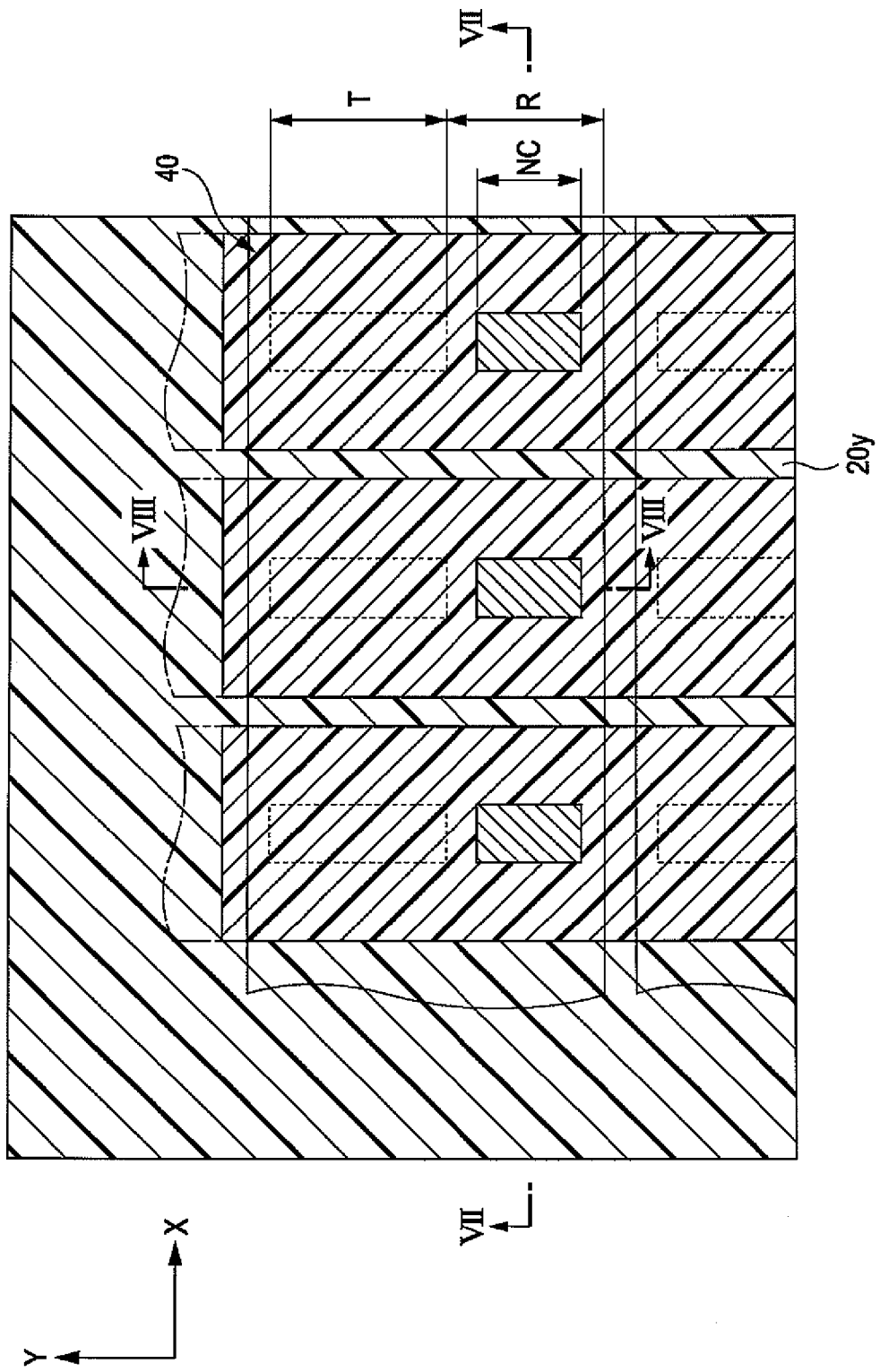
FIG. 6 is a plan view according to a second embodiment.

FIG. 6 is a plan view of the lower substrate in a portion corresponding to P portion of FIG. 1. In FIG. 6, a short direction (a horizontal direction) of the sub-pixel 40 is referred to as X direction and a long direction (a vertical direction) thereof is referred to as Y direction. The liquid crystal device according to the second embodiment is different from the first embodiment in that the non-colored region NC is disposed in the central portion of the sub-pixels 40, wherein in the first embodiment, the non-colored region NC is disposed in the peripheral portion of the sub-pixels 40. Therefore, the description of the same constitution as the first embodiment will be omitted.

As shown in FIG. 6, the light shielding part 20y in a band shape is provided in the region between sub-pixels (the region between sub-pixels extending in Y direction) in the neighboring sub-pixels 40 of different colors in X direction. A transmissive region T and a non-colored region NC in a reflective region R are disposed in the central portions of X direction in the sub-pixels, in parallel in Y direction.

Figure 7:
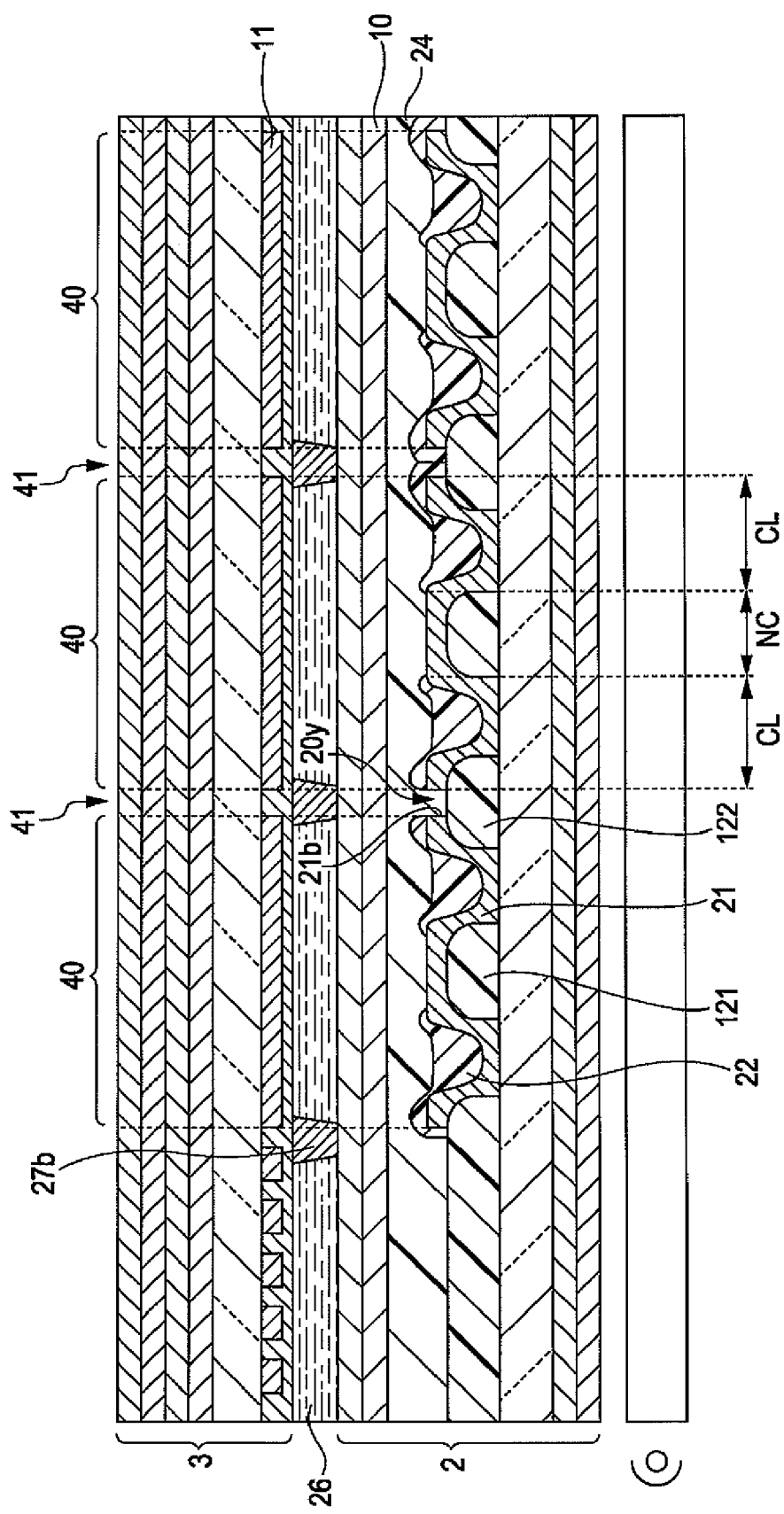
FIG. 7 is a cross-sectional view taken along VII-VII line of FIG. 6.

FIG. 7 is a cross-sectional view taken along VII-VII line in FIG. 6. As shown in FIG. 7, the inner surface of the upper substrate 3 is provided with a photo spacer 27b in a pole shape and the point of the photo spacer is engaged with the surface of the lower substrate 2 so that the cell thickness of the liquid crystal layer 26 can be secured.

In the second embodiment, a first control film 121 controlling the step difference of the colorant layers 22 is disposed in the central portions of the sub-pixels 40 in the surface of the lower substrate 2. The width of the first control film 121 is set to be equal to that of the non-colored region NC. In addition to the first control film 121 disposed in the central portions of the sub-pixels 40, a second control film 122 is disposed in the region 41 between the sub-pixels. The width of the second control film is set to be equal to or wider than that of the region 41 between the sub-pixels.

The reflective film 21 is formed from the surface of the first control film 121 to the surface of the second control film 122. The reflective film 21 disposed on the surface of the second control film 122 is formed with the slit 21b having the same width as the region 41 between the sub-pixels. Therefore, the light shielding part 20y is formed in the region 41 between the sub-pixels.

Further, the colorant layer 22 is formed on the surface of the reflective film 21 between the first control film 121 and the second control film 122. The colored region CL in which the colorant layer 22 is disposed and the non-colored region NC in which the colorant layer 22 is not disposed are provided. The overcoat film (a planarization film) 24 is formed so as to cover both the regions.

However, the liquid crystal alignment in the peripheral portions of the sub-pixels 40 can be easily dispersed when voltage is applied thereto. For this reason, it causes the problem that a display is not dark upon displaying black display. In the first embodiment, the non-colored reflective region is provided in the peripheral portions inside of the sub-pixels so that a display becomes bright upon displaying the black display, thereby degrading contrast.

On the other hand, in the second embodiment, since the non-colored region NC is disposed in the central portions of the sub-pixels 40 and the colored region is disposed in the peripheral portions of the sub-pixels 40, a display becomes dark upon displaying the black display as compared with the case of the non-colored region, thereby implementing image display with good contrast.

Also, in the liquid crystal device of the related art shown in FIG. 10B, the reflective film 21 and the colorant layer 22 are disposed in the colorant region CL, while only the reflective film 21 is disposed in the non-colored region NC. Therefore, the step difference of about 0.5 to 2.0 μm corresponding to the thickness of the colorant layer is formed. Thereby, the step difference G between both the regions in the surface of the overcoat film 24 becomes large.

Figure 8:
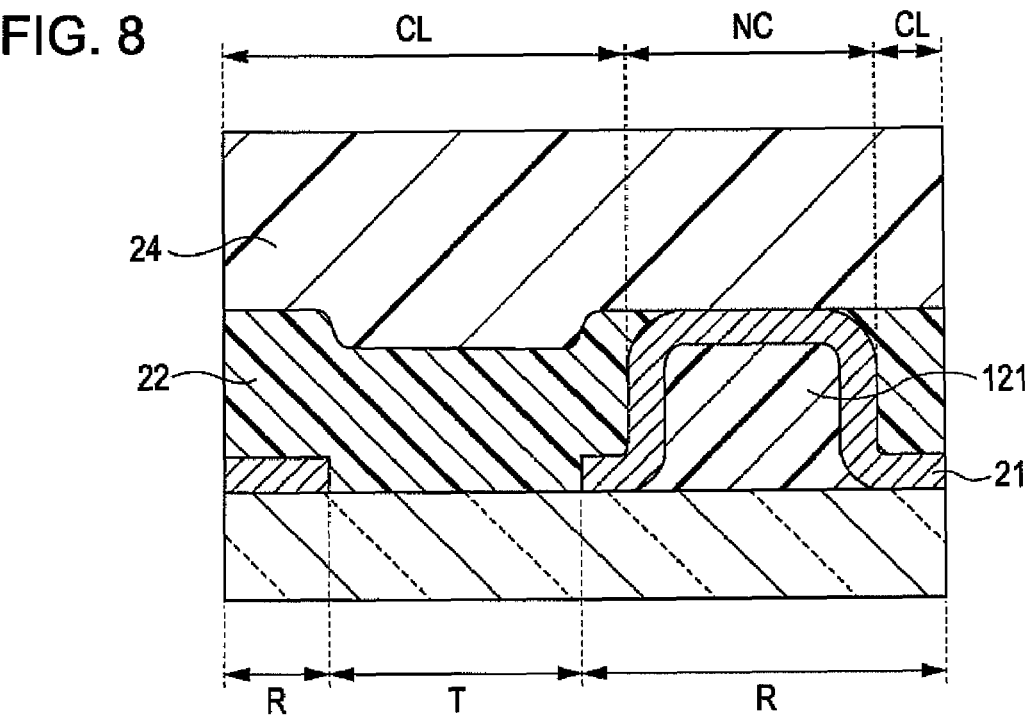
FIG. 8 is a cross-sectional view taken along VIII-VIII line of FIG. 6.

FIG. 8 shows a cross-sectional view taken along VIII-VIII line of FIG. 6. As shown in FIG. 8, in the liquid crystal device according to the second embodiment, the reflective film 21 and the colorant layer 22 are disposed in the colored region CL and the reflective film 21 and the first control film 121 are disposed in the non-colored region NC. The thickness of the first control film 121 is set to be equal to that of the colorant layer 22 so that the step difference between the colored region CL and the non-colored region NC is not almost generated. Thereby, the step difference between both the regions in the surface of the overcoat film 24 becomes small so that it is possible to make the cell thickness uniform. If the thickness of the first control film 121 and the colorant layer 22 is set to be equal and then each deviation is managed to be ±0.2 μm, the difference of the film thickness therebetween becomes 0.4 μm at a maximum and the step difference between the colored region CL and the non-colored region NC becomes 0.4μm or less. In the related art, since the step difference of 0.5 μm or more corresponding to the thickness of the colorant layer is formed, the management of the film thickness is performed as described above so that the step difference can be reduced.

Electronic Apparatus

Figure 9:
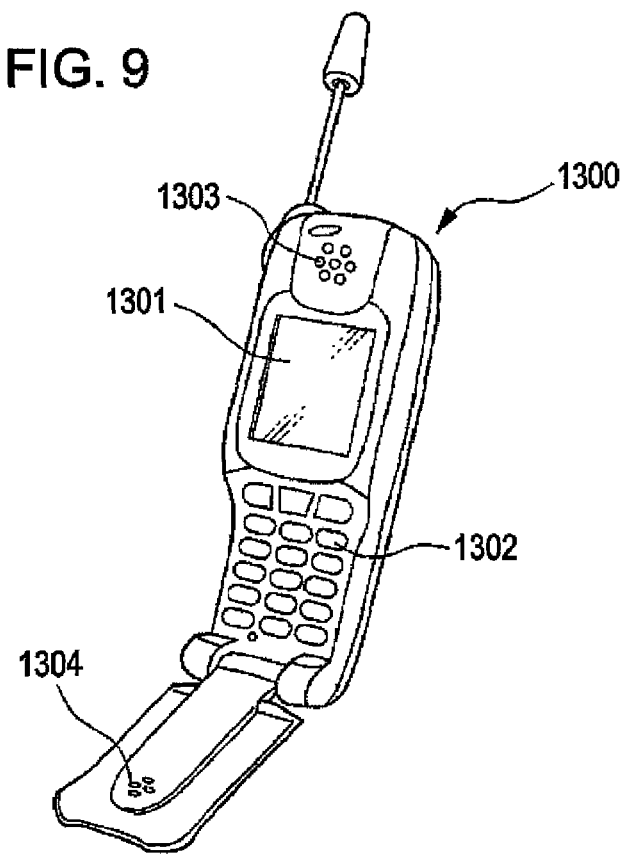
FIG. 9 is a perspective view of a mobile phone.

FIG. 9 shows a perspective view of one example of an electronic apparatus according to the invention. A mobile phone 1300 shown in FIG. 9 comprises a small-sized liquid crystal device as a display part 1301, a plurality of operating buttons 1302, a receiver 1303, and transmitter 1304.

The display apparatuses according to each embodiment are not limited to the mobile phone, but can be properly used as a image display apparatus such as an electronic book, a personal computer, a digital still camera, a liquid crystal TV, a viewfinder type or a monitor direct viewing type of a video tape recorder, a car navigation device, a pager, an electronic note, a calculator, a word processor, a workstation, a video phone, a POS terminal, an apparatus having a touch panel. In any electronic apparatuses, the liquid crystal device of a uniform cell thickness and a high aperture ratio is provided so that an image display of high brightness and high contrast can be made.

The technical scope of the invention is not limited to each embodiment described above, but includes changes made in these embodiments without departing from the principles and spirit of the invention. That is, materials and constitutions described in each embodiment is only example and proper change thereof can be made.

For example, although the liquid crystal device of a passive matrix manner is described as an example in each embodiment, the invention can be applied to a liquid crystal device of an active matrix manner using a thin film diode (TFD) as a switching element. Although the transflective liquid crystal device is described in each embodiment, the invention can be applied to a total reflective type of a liquid crystal device having a colored region and a non-colored region.

The reflective film is formed to cover the almost whole surface of the display region so that it is used as the reflective type display apparatus. The sub-pixels corresponding to any predetermined colors is not provided the non-pixel region, but is provided with only colored regions. In this case, the control film is provided in the region between the sub-pixels. In addition, the reflective film does not have a simple reflective function, but also includes a film having a reflective polarizing function with a reflection axis and transmission axis orthogonal thereto. In this case, the $\lambda/4$ plate shown in FIG. 3 is not required.

In each embodiment, the slit of the reflective film is formed on the upper surface of all the control films formed in the region between the sub-pixels so that the light shielding part is provided. Conversely, the slit of the reflective film is not formed on the upper surface of some control films so that the light shielding part is not provided. For example, in the region between the sub-pixels neighboring the sub-pixels formed with a blue colorant layer, the slit of the reflective film is not formed on the upper surface of the control film so that the light shielding part is not provided.

The entire disclosure of Japanese Patent Application No. 2005-350223, filed Dec. 5, 2005 is expressly incorporated by reference herein.

What is claimed is:

1. A liquid crystal device, comprising:
    a pair of substrates disposed opposite each other, one of the substrates being provided with a plurality of sub-pixels;
    a liquid crystal layer being sandwiched between the substrates;
    a colorant layer formed in a colored region of the one substrate;
    a control film that is different from the colorant layer, that is provided in a non-colored region of the one substrate, and that controls a step difference between the colored region in which the colorant layer exists and the non-colored region in which the colorant layer does not exist so that the surface of the liquid crystal layer on the one substrate corresponding to the sub-pixels is planarized; and
    a reflective film formed in both the colored region and the non-colored region,
    wherein the reflective film is positioned between the colorant layer and the one substrate in the colored region, and
    wherein the control film is positioned between the reflective film and the one substrate in the non-colored region.

2. The liquid crystal device according to claim 1, wherein each of the sub-pixels comprises a reflective region in which the reflective film exists and a transmissive region in which the reflective film does not exist, and
    the colorant layer is provided (i) in the transmissive region and (ii) in a portion of the reflective region and on the reflective film.

3. The liquid crystal device according to claim 2, wherein the control film includes a resin material.

4. The liquid crystal device according to claim 1, wherein the control film includes a material with a light-shielding property, and is formed in a region between neighboring sub-pixels among the plurality of the sub-pixels.

5. The liquid crystal device according to claim 4, wherein the reflective film is not formed on the control film in the region between the neighboring sub-pixels.

6. The liquid crystal device according to claim 1, wherein the liquid crystal device has a display region in which the plurality of the sub-pixels are provided, and
    wherein the control film includes a material with a light-shielding property, and is formed (a) in the display region and (b) in a non-display region around the display region.

7. The liquid crystal device according to claim 6, wherein the non-display region is free of the reflective film.

8. The liquid crystal device according to claim 1, wherein the thickness of the control film is equal to that of the colorant layer.

9. The liquid crystal device according to claim 1, wherein
    the colored region is disposed in a central portion of each of the sub-pixels; and
    the non-colored region is disposed in a peripheral portion of each of the sub-pixels.

10. The liquid crystal device according to claim 1, wherein
    the non-colored region is disposed in a central portion of each of the sub-pixels; and
    the colored region is disposed in a peripheral portion of each of the sub-pixels.

11. The liquid crystal device according to claim 1, wherein a side surface of the control film is inclined and the reflective film is disposed on the inclined surface.

12. An electronic apparatus, comprising the liquid crystal device according to claim 1.

13. The liquid crystal device according to claim 1, wherein the reflective film extends continuously obliquely upwardly from under the colorant layer in the colored region, to a location between and coelevational with both the colorant layer and the control film, and then to above the control film in the non-colored region.

14. The liquid crystal device according to claim 1, wherein the reflective film is in direct contact with the one substrate in the colored region.

15. The liquid crystal device according to claim 1, wherein the colorant layer is positioned without overlaying any portion of the control film.

16. The liquid crystal device according to claim 1, wherein the control film includes a material with a light-shielding property, and is formed (a) in the sub-pixels and (b) in a region between neighboring sub-pixels among the plurality of the sub-pixels.

17. The liquid crystal device according to claim 16, wherein the control film in the region between the neighboring sub-pixels is exposed without being covered by the reflective film.

* * * * *